US012782746B2

(12) United States Patent
Xiao et al.

(10) Patent No.: US 12,782,746 B2
(45) Date of Patent: Nov. 3, 2026

(54) OPTICAL IMAGING APPARATUS

(71) Applicant: BEIJING UNICORN TECHNOLOGY CO., LTD., Beijing (CN)

(72) Inventors: Jiasheng Xiao, Beijing (CN); Bing Xiao, Beijing (CN)

(73) Assignee: BEIJING UNICORN TECHNOLOGY CO., LTD., Beijing (CN)

(*) Notice: Subject to any disclaimer, the term of this patent is extended or adjusted under 35 U.S.C. 154(b) by 1071 days.

(21) Appl. No.: 17/995,088

(22) PCT Filed: Mar. 30, 2021

(86) PCT No.: PCT/CN2021/083800
§ 371 (c)(1),
(2) Date: Sep. 29, 2022

(87) PCT Pub. No.: WO2021/197293
PCT Pub. Date: Oct. 7, 2021

(65) Prior Publication Data

US 2023/0176392 A1 Jun. 8, 2023

(30) Foreign Application Priority Data

Mar. 31, 2020 (CN) ......................... 202010241961.7

(51) Int. Cl.
*G02B 27/18* (2006.01)
*G02B 5/30* (2006.01)
(Continued)

(52) U.S. Cl.
CPC ........... *G02B 27/18* (2013.01); *G02B 5/3025* (2013.01); *G02B 7/003* (2013.01); *G02B 27/017* (2013.01);
(Continued)

(58) Field of Classification Search
CPC ..... G02B 27/00–648; G02B 2027/0105–0198; G02B 5/00–32; G02B 7/00–40
See application file for complete search history.

(56) References Cited

U.S. PATENT DOCUMENTS 6,011,653 A * 1/2000 Karasawa .......... G02B 27/0172 348/E5.145
6,330,121 B1 12/2001 Koayashi et al.
(Continued)

FOREIGN PATENT DOCUMENTS

CN 205539729 U 8/2016
CN 106842482 A 6/2017
(Continued)

OTHER PUBLICATIONS

The Extended European Search Report received in the corresponding European Application 2180738.7, mailed on Aug. 31, 2023.
(Continued)

*Primary Examiner* — Christopher A Lamb, II
(74) *Attorney, Agent, or Firm* — K&L Gates LLP

(57) ABSTRACT

The present disclosure provides an optical imaging apparatus, including: a first optical element including an image projection component and a first positioning component that are integrally formed, a second optical element including a beam splitting component and a second positioning component that are integrally formed, and a third optical element including a reflective component and a third positioning component that are integrally formed; structures of the first positioning component, the second positioning component, and the third positioning component cause the image projection component, the beam splitting component, and the reflective component achieve optical alignment according to desired optical accuracy index requirements. In the apparatus described above, respective elements are assembled based on their respective positioning components without
(Continued)

aid of other components, which reduces difficulty of mounting among respective elements and simplifies the mounting process. Meanwhile, the positioning component in each element is integrated with other components, which further reduces the mounting error among the respective elements, thereby further improving mounting accuracy of the optical system.

18 Claims, 11 Drawing Sheets

(51) Int. Cl.
*G02B 7/00* (2021.01)
*G02B 27/01* (2006.01)
*G02B 27/10* (2006.01)

(52) U.S. Cl.
CPC .. *G02B 27/1066* (2013.01); *G02B 2027/0185* (2013.01)

(56) References Cited

U.S. PATENT DOCUMENTS

| | | | | |
|---|---|---|---|---|
| 6,404,556 | B1 | 6/2002 | Kobayashi | |
| 6,646,809 | B1 | 11/2003 | Ishino et al. | |
| 2012/0236030 | A1 | 9/2012 | Border et al. | |
| 2015/0070773 | A1* | 3/2015 | Wang | G02B 5/30 359/631 |
| 2016/0363770 | A1* | 12/2016 | Kim | G02B 27/0093 |
| 2017/0255017 | A1* | 9/2017 | Haseltine | G02B 27/0176 |
| 2018/0120567 | A1 | 5/2018 | Cobb | |
| 2019/0197790 | A1* | 6/2019 | Lan | G02B 27/0172 |
| 2020/0026072 | A1 | 1/2020 | Brown et al. | |

FOREIGN PATENT DOCUMENTS

| | | | |
|---|---|---|---|
| CN | 108572457 | A | 9/2018 |
| CN | 109445111 | A | 3/2019 |
| CN | 109709676 | A | 5/2019 |
| CN | 209842238 | U | 12/2019 |
| CN | 209879145 | U | 12/2019 |
| CN | 111290126 | A | 6/2020 |
| CN | 211426943 | U | 9/2020 |

OTHER PUBLICATIONS

International Search Report mailed in International Application PCT/CN2021/083802 on Jun. 22, 2021.

* cited by examiner

OPTICAL IMAGING APPARATUS

CROSS REFERENCES TO RELATED APPLICATIONS

This application is a National Stage of International Application No. PCT/CN2021/083800, filed Mar. 30, 2021, entitled "OPTICAL IMAGING APPARATUS," which claims priority to Chinese Patent Application No. 202010241961.7, filed Mar. 31, 2020, entitled "OPTICAL IMAGING APPARATUS," both of which are hereby incorporated by reference in their entireties for all purposes.

FIELD

The present disclosure relates generally to the technical field of optical engineering, and more particularly, to an optical imaging apparatus.

BACKGROUND

AR (Augmented Reality) is a technology that ingeniously integrates virtual information with the real world, and AR has been widely used in medical, industrial, education, entertainment and other fields. As for AR, computer-generated text, images, 3D models, music, videos and other virtual information are superimposed to the real world after being simulated, and the two kinds of information complement each other, thereby enhancing the real world.

The apparatus for implementing augmented reality includes several optical elements, and these optical elements are assembled in a certain combination to present virtual information and real scenes to users, and in turn to achieve augmented reality display.

SUMMARY

In view of the above, the present disclosure provides an optical imaging apparatus, including: a first optical element, the first optical element including an image projection component and a first positioning component integrally formed with the image projection component; a second optical element, the second optical element including a beam splitting component and a second positioning component integrally formed with the beam splitting component; and a third optical element, the third optical element including a reflective component and a third positioning component integrally formed with the reflective component; the beam splitting component is configured to reflect image light emitted by the image projection component to the reflective component and transmit image imaging light and ambient imaging light emitted by the reflective component, the reflective component is configured to reflect image imaging light emitted by the beam splitting component and transmit the ambient imaging light, structures of the first positioning component, the second positioning component and the third positioning component to enable the image projection component, the beam splitting component and the reflective component to achieve optical alignment according to desired optical accuracy index requirements after the first optical element, the second optical element and the third optical element are assembled into an optical imaging apparatus.

Each element in the apparatus contains a positioning component, and respective elements, when assembled based on their respective positioning components, are assembled in direct contact without aid of other components, which reduces the difficulty of mounting optical elements and simplifies mounting process of an optical system. In addition, the positioning component in each element is integrated with other components, which further reduces assembly error among the respective elements, thereby further improving mounting accuracy of the optical system.

According to an aspect of the present disclosure, an optical imaging apparatus is provided, including: a first optical element, the first optical element including an image projection component and a first positioning component integrally formed with the image projection component; a second optical element, the second optical element including a beam splitting component and a second positioning component integrally formed with the beam splitting component; and a third optical element, the third optical element including a reflective component and a third positioning component integrally formed with the reflective component; the beam splitting component is configured to reflect image light emitted by the image projection component to the reflective component and transmit image imaging light from the reflective component and ambient imaging light transmitted by the reflective component, the reflective component is configured to reflect image imaging light from the beam splitting component and transmit the ambient imaging light, structures of the first positioning component, the second positioning component and the third positioning component are configured to enable the image projection component, the beam splitting component and the reflective component to achieve optical alignment according to desired optical accuracy index requirements after the first optical element, the second optical element and the third optical element are assembled into an optical imaging apparatus.

BRIEF DESCRIPTION OF THE DRAWINGS

By referring to the following appended drawings, a further understanding of the nature and advantages of the embodiments of the present application may be achieved. In the appended drawings, similar components or features may have the same reference label. The appended drawings are used to provide a further understanding of the embodiments of the present invention and constitute a part of the present application, and used to, together with the following detailed description, explain the embodiments of the present application, but do not constitute a limitation to the embodiments of the present application. In the appended drawings.

DETAILED DESCRIPTION

The subject described herein will be discussed below with reference to example embodiments. It should be understood that discussion of these embodiments is only to enable those skilled in the art to better understand and implement the subject described herein, and is not to limit the application. Functions and arrangements of the discussed elements may be changed without departing from the protection scope of the content of embodiments of the present application. Various examples may omit, replace or add various processes or components as needed. In addition, features described with respect to some examples may also be combined in other examples.

As used herein, the term "including" and its variants represents open terms, meaning "including but not limited to." The term "based on" represents "based at least in part on." The terms "one embodiment" and "an embodiment" represent "at least one embodiment." The term "another embodiment" represents "at least one other embodiment." The terms "first", "second", etc. may refer to different or the same objects. Other definitions may be included below, either explicit or implicit. The definition of a term is consistent throughout the application, unless clearly indicated otherwise in the context.

Herein, the term "connection" refers to direct mechanical connection, communication or electrical connection between two components, or indirect mechanical connection, communication or electrical connection through intermediate components. The term "electrical connection" refers to that two components can electrically communicate with each other for data/information exchange. Likewise, the electrical connection may refer to a direct electrical connection between two components, or an indirect electrical connection through intermediate components. The electrical connection may be implemented in a wired manner or a wireless manner.

AR is a technology that ingeniously integrates virtual information with the real world, and AR has been widely used in medical, industrial, education, entertainment and other fields. As for AR, computer-generated text, images, 3D models, music, videos and other virtual information are superimposed to the real world after being simulated, and the two kinds of information complement each other, thereby enhancing the real world.

The apparatus for implementing augmented reality includes several optical elements, and these optical elements are assembled in a certain combination to present virtual information and real scenes to users, and in turn to achieve augmented reality.

At present, an augmented reality apparatus is assembled with the aid of a mounting bracket. The mounting bracket has positions for mounting respective optical elements, and when each optical element is mounted at a corresponding position on the mounting bracket, namely, the mounting is completed and a complete augmented reality display apparatus is formed.

Figure 1:
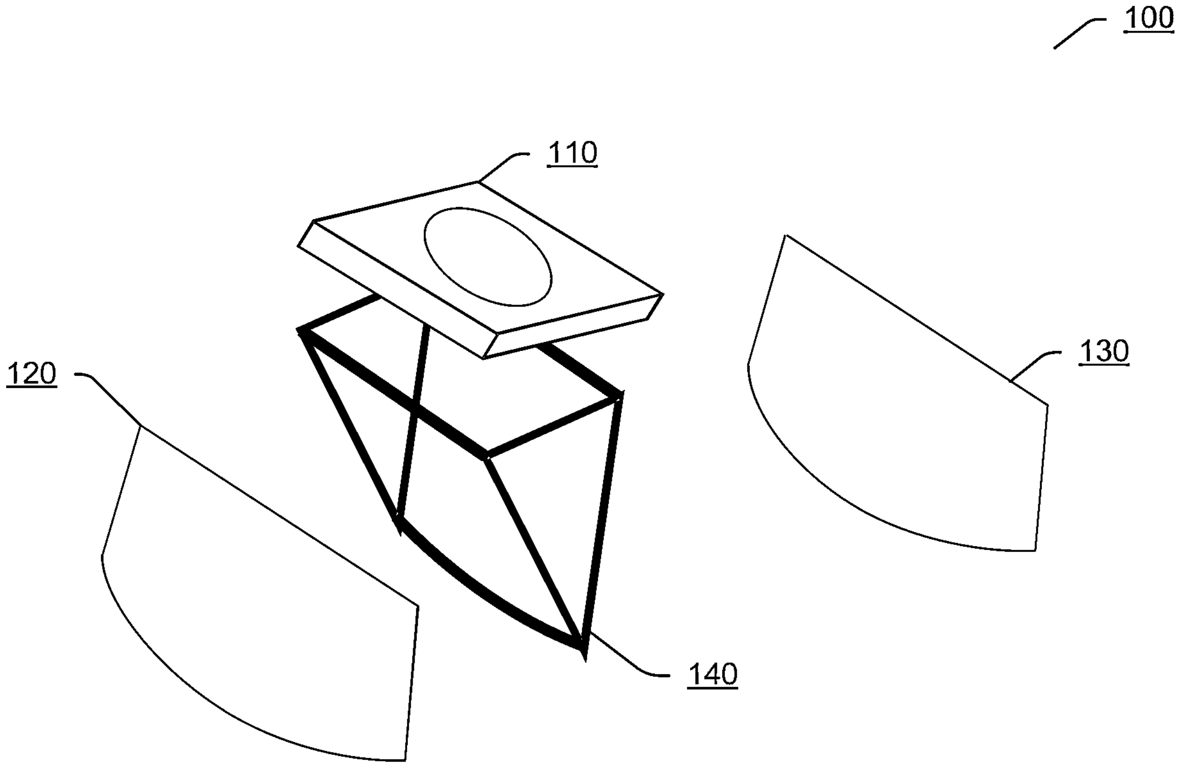
FIG. 1 illustrates a schematic diagram of using a mounting bracket to mount an optical element in an augmented reality apparatus of an example in the related art.

Since an augmented reality display apparatus includes several optical elements, and respective optical elements are precisely matching each other to achieve the desired augmented reality effect, therefore, strict optical accuracy requirements must be met among respective optical elements during the mounting process. Current mounting is based on a mounting bracket, where respective optical elements are mounted on the mounting bracket rather than in direct contact with each other. FIG. 1 illustrates a schematic diagram of using a mounting bracket to mount an optical element in an augmented reality apparatus of an example in the related art. As shown in FIG. 1, an augmented reality apparatus 100 includes an image source element 110, a beam splitting element 120, and a reflective element 130, a mounting bracket 140 is a formed bracket, and each position on the mounting bracket 140 is mounted with a corresponding optical element. During the mounting process, the image source element 110 is mounted on the corresponding upper frame, the beam splitting element 120 is mounted on the corresponding left frame, and the reflective element 130 is mounted on the corresponding block right frame. The augmented reality apparatus 100 includes the image source element 110, the beam splitting element 120, the reflective element 130, and the mounting bracket 140 after the mounting is completed.

However, there is a mounting error from mounting of each optical element on a mounting bracket 140, and the mounting error between each optical element and the mounting bracket 140 needs to be independently adjust during mounting, which makes assembly process for the optical elements to be difficult and the adjustment to be cumbersome, which in turn leads to weakened augmented reality effect of the assembled apparatus.

In order to solve the problems described above, the present disclosure provides an optical imaging apparatus, including: a first optical element, the first optical element including an image projection component and a first positioning component integrally formed with the image projection component; a second optical element, the second optical element including a beam splitting component and a second positioning component integrally formed with the beam splitting component; and a third optical element, the third optical element including a reflective component and a third positioning component integrally formed with the reflective component. The beam splitting component is configured to reflect image light emitted by the image projection component to the reflective component and transmit image imaging light and ambient imaging light which are transmitted by the reflective component. The reflective component is configured to reflect image imaging light for the image from the beam splitting component and transmit the ambient imaging light. Structures of the first positioning component, the second positioning component, and the third positioning component are configured to enable the image projection component, the beam splitting component and the reflective component to achieve optical alignment according to desired optical accuracy index requirements after the first optical element, the second optical element and the third optical element are assembled into an optical imaging apparatus.

Each optical element in the apparatus contains a positioning component, and respective optical elements are assembled in direct contact without the aid of other components when assembled based on their respective positioning components. In this case, there is only mounting error among respective optical elements, and the mounting error is assembly error among the respective optical elements, thus optical error among the respective optical elements are fixed. Meanwhile, a positioning component in each optical element is integrally formed with other component with high accuracy, which further reduces assembly error among the respective optical elements.

An optical imaging apparatus according to the present disclosure is described in detail below in conjunction with the appended drawings.

Figure 2:
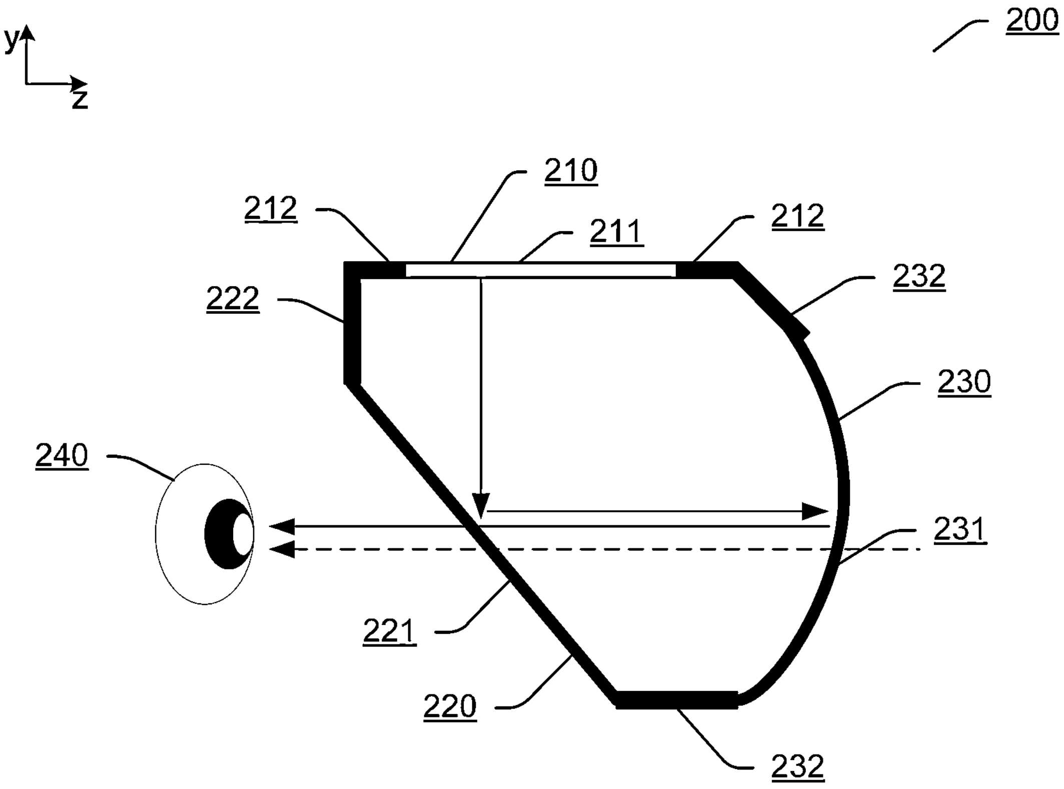
FIG. 2 illustrates a schematic diagram of an optical imaging apparatus of an example of an embodiment of the present disclosure.

FIG. 2 illustrates a schematic diagram of an optical imaging apparatus of an example of an embodiment of the present disclosure. It should be noted that the optical imaging apparatus has a three-dimensional structure, and a three-dimensional coordinates (such as the xyz coordinate system) can be used as reference system, the schematic diagram shown in FIG. 2 is a schematic diagram of a viewing angle, and the schematic diagram uses the yz coordinate system as reference system. In an example, the optical imaging apparatus can be head mounted.

As shown in FIG. 2, the optical imaging apparatus 200 includes a first optical element 210, a second optical element 220, and a third optical element 230, and the optical imaging apparatus can also include other optical elements other than the above three elements.

In the present disclosure, an optical imaging apparatus 200 is an apparatus that performs imaging through cooperation of various optical elements, and in an example of the present disclosure, an optical imaging apparatus 200 can be an augmented reality display apparatus, a VR (Virtual Reality, virtual reality technology) apparatus, etc., and the optical imaging apparatus 200 can be in the form of glasses, helmet, etc. For example, the optical imaging apparatus 200 is AR glasses.

In the present disclosure, a first optical element 210 is configured to generate an image and project the generated image. For example, the first optical element 210 can be configured to play a video, and emit light of the played image through a display screen.

A first optical element 210 can include an image projection component 211 and a first positioning component 212. The image projection component 211 is configured to project image. For example, the image projection component 211 can be one of a tablet, a mobile phone, and a display screen, etc. The first positioning component 212 is configured to determine relative position of the first optical element 210 and other optical elements to implement assembly of the first optical element 210 and other optical elements according to an expected structure.

A position of the first positioning component 212 on a first optical element 210 can be specified. In an example, a first positioning component 212 can be distributed on two sides or three sides of a first optical element 210. In another example, a first positioning component 212 can be distributed around a first optical element 210, e.g., the first positioning components 212 surrounds an image projection component 211.

Figure 3:
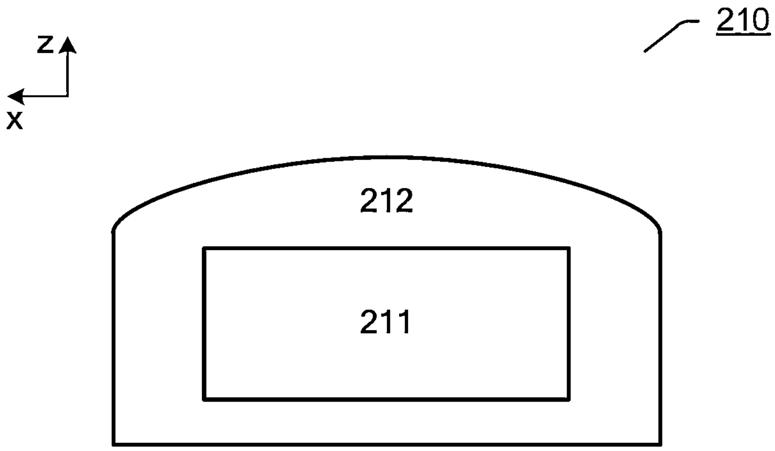
FIG. 3 illustrates a schematic diagram of a first optical element of an example of an embodiment of the present disclosure.

Taking FIG. 3 as an example, FIG. 3 illustrates a schematic diagram of a first optical element 210 of an example of an embodiment of the present disclosure. The schematic diagram shown in FIG. 3 takes xz coordinate system as a reference system. As shown in FIG. 3, the block represents an image projection component 211, and the portion between the block and edges of the first optical element 210 includes a first positioning component 212.

The image projection component 211 and the first positioning component 212 are integrally formed. In an example, the image projection component 211 and the first positioning component 212 are generated during the production or manufacturing process of the first optical element 210, and the image projection component 211 and the first positioning component 212 are connected together as one object.

In the present disclosure, a second optical element 220 can include a beam splitting component 221 and a second positioning component 222 that are integrally formed. The beam splitting component 221 can perform reflection, transmission and other processing on the light reaching itself. In an example, the beam splitting component 221 can include an optical region capable of processing light, and when light reaches the optical region, the beam splitting component 221 can process the light accordingly.

A second positioning component 222 is configured to determine relative position of a second optical element 220 and other optical elements to implement assembly of the second optical element 220 and other optical elements according to an expected structure. A position of the second positioning component 222 on the second optical element 220 can be specified. In an example, a second positioning component 222 can be distributed on two sides or three sides of a second optical element 220. In another example, a second positioning component 222 can be distributed around a second optical element 220.

Figure 4:
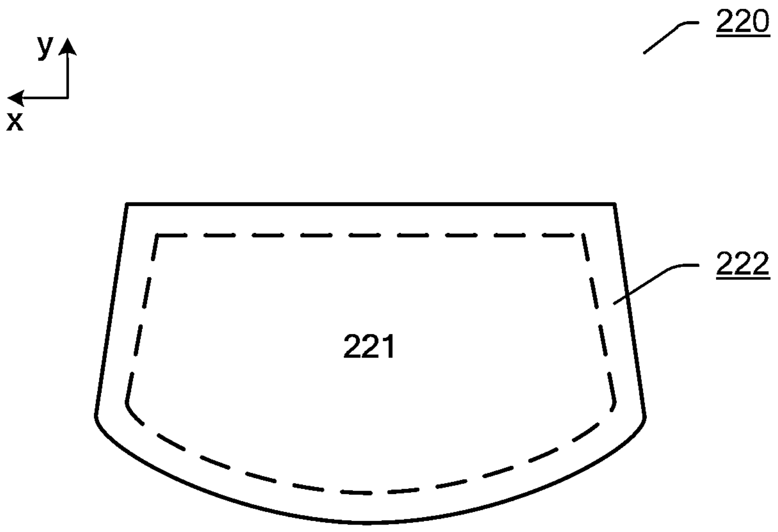
FIG. 4 illustrates a schematic diagram of a second optical element of an example of an embodiment of the present disclosure.

Taking FIG. 4 as an example, FIG. 4 illustrates a schematic diagram of a second optical element 220 of an example of an embodiment of the present disclosure. The schematic diagram shown in FIG. 4 takes xy coordinate system as reference system. As shown in FIG. 4, the dashed block represents a beam splitting component 221, and the portion between the dashed block and edges of the second optical element 220 includes a second positioning component 222.

In the present disclosure, a third optical element 230 can include a reflective component 231 and a third positioning component 232 that are integrally formed. The reflective component 231 can perform reflection, transmission and other processing on the light reaching the component. In an example, a reflective component 231 can include an optical region capable of processing light, and when light reaches the optical region, the reflective component 231 can process the light accordingly.

A third positioning component 232 is configured to determine relative position of a third optical element 230 and other optical elements to implement assembly of the third optical element 230 and other optical elements according to an expected structure. A position of the third positioning component 232 on the third optical element 230 can be specified. In an example, a third positioning component 232 can be distributed on two sides or three sides of a third optical element 230. In another example, a third positioning component 232 can be distributed around a third optical element 230.

Figure 5:
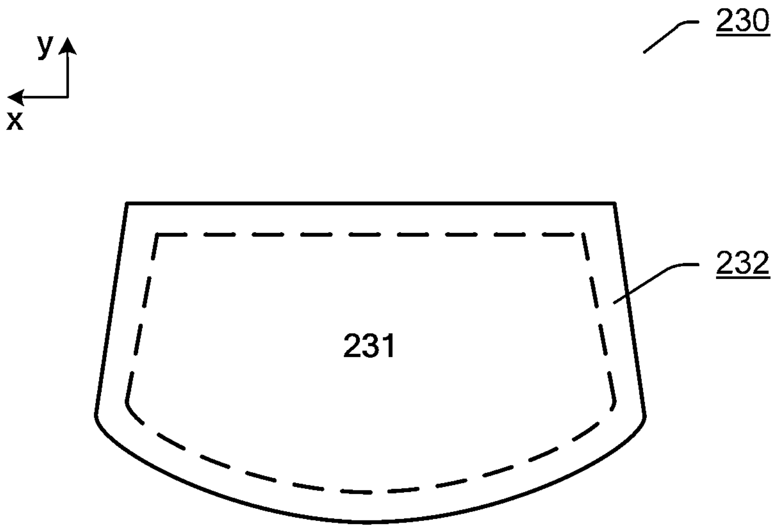
FIG. 5 illustrates a schematic diagram of a third optical element of an example of an embodiment of the present disclosure.

Taking FIG. 5 as an example, FIG. 5 illustrates a schematic diagram of a third optical element 230 of an example of an embodiment of the present disclosure. The schematic diagram shown in FIG. 5 takes xy coordinate system as reference system. As shown in FIG. 5, the dashed block represents a reflective component 231, and the portion between the dashed block and edges of the third optical element 230 includes a third positioning component 232.

In an example of the present disclosure, an image projection component includes an image source and a circular polarizer that is attached to or adjacent to the side of the image source facing a beam splitting component, a beam splitting component includes a polarizer and a wave plate attached to the side of the polarizer facing a reflective component, and the reflective component includes a transflective element. The wave plate included in the beam splitting component can be a quarter wave plate.

Figure 6:
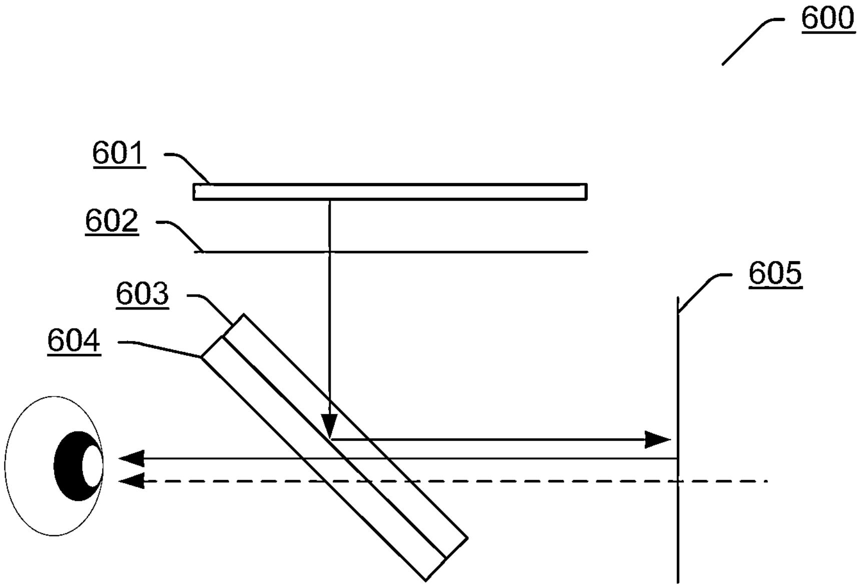
FIG. 6 illustrates a schematic diagram of an optical imaging apparatus of an example of the present disclosure.

FIG. 6 illustrates a schematic diagram of an optical imaging apparatus of an example of the present disclosure. As shown in FIG. 6, in an optical imaging apparatus 600, an image source 601 emits imaging light to a circular polarizer 602, the circular polarizer 602 transmits the imaging light, and the transmitted imaging light is converted into a third polarization state (right-handed circularly polarized light), the imaging light in the third polarization state is projected to a quarter wave plate 603, and the quarter wave plate 603 transmits and converts the imaging light in the third polarization state into a first polarization state (linearly polarized light whose vibration direction is a first direction), the imaging light in the first polarization state is reflected by a polarizer 604 to the quarter wave plate 603, and the quarter wave plate 603 converts the imaging light in the first polarization state into the imaging light in the third polarization state, the imaging light in the third polarization state is propagated to a transflective element 605, and the transflective element 605 reflects and converts the imaging light in the third polarization state into the imaging light in a fourth polarization state (left-handed circularly polarized light). The imaging light in the fourth polarization state is transmitted through the quarter wave plate 603 and converted into the imaging light in the second polarization state (linearly polarized light whose vibration direction is a second direction). The imaging light in the second polarization state is transmitted to a human eye position through a polarizer 604.

Ambient light (shown by the dashed line in the drawings) is transmitted from the outside through the transflective element 605 and propagates forward to the quarter wave plate 603, and the ambient light is transmitted to the polarizer 604 by the quarter wave plate 603, and is transmitted to the human eye position through the polarizer 604.

In an example of the present disclosure, an image projection component includes an image source and a first polarizer that is attached to or adjacent to the side of the image source facing a beam splitting component, a beam splitting component includes a transflective element, and a reflective component includes a second polarizer.

Figure 7:
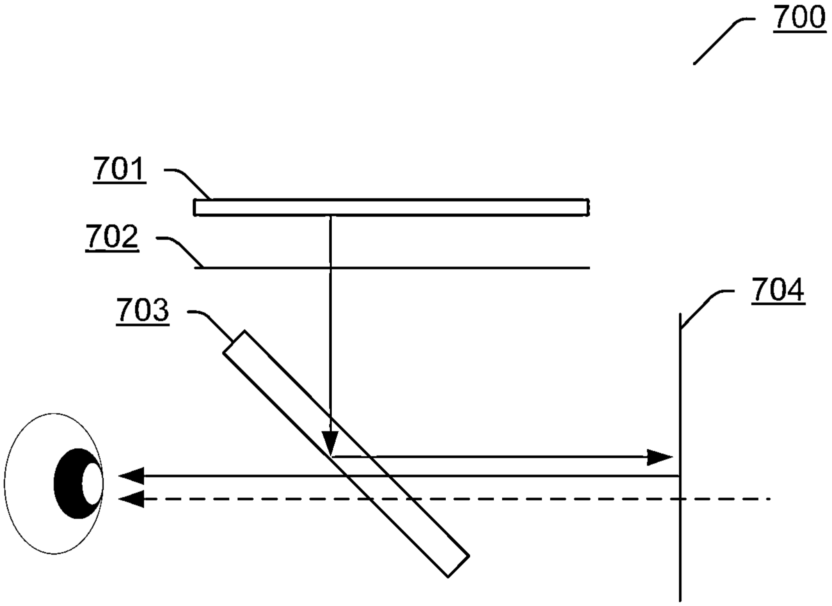
FIG. 7 illustrates a schematic diagram of an optical imaging apparatus of another example of the present disclosure.

FIG. 7 illustrates a schematic diagram of an optical imaging apparatus of another example of the present disclosure. As shown in FIG. 7, in an optical imaging apparatus 700, an image source 701 emits imaging light to a first polarizer 702, the first polarizer 702 transmits the imaging light in a first polarization state (linearly polarized light whose vibration direction is a first direction) to a transflective element 703, the transflective element 703 reflects the imaging light to a second polarizer 704. The second polarizer 704 can reflect light in a first polarization state, based on this, imaging light in the first polarization state is reflected to the transflective element 703 by the second polarizer 704 and is further transmitted to a human eye position through the transflective element 703.

Ambient light (shown by the dashed line in the drawings) in a second polarization state (linearly polarized light whose vibration direction is a second direction) is transmitted from the outside through the second polarizer 704 and propagates forward to the transflective element 703, and is further transmitted to the human eye position through the transflective element 703. The ambient light in a first polarization state is reflected by the second polarizer 704.

In an example of the present disclosure, an image projection component includes an image source, a beam splitting component includes a polarizer, and a reflective component includes a transflective element and a wave plate that is attached to or adjacent to the side of the transflective element facing the beam splitting component.

Figure 8:
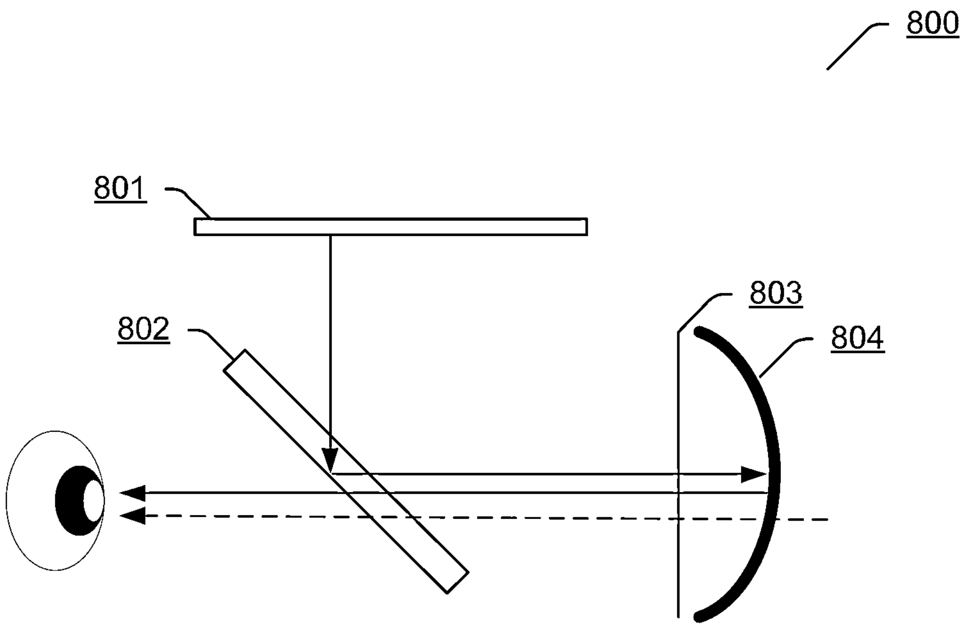
FIG. 8 illustrates a schematic diagram of an optical imaging apparatus of another example of the present disclosure.

FIG. 8 illustrates a schematic diagram of an optical imaging apparatus of another example of the present disclosure. As shown in FIG. 8, in an optical imaging apparatus 800, an image source 801 emits imaging light to a polarizer 802, the polarizer 802 reflects the imaging light in a first polarization state (linearly polarized light whose vibration direction is a first direction) to a wave plate 803, the wave plate 803 can convert light in the first polarization state into circularly polarized light, and the converted circularly polarized light is propagated to a transflective element 804. The transflective element 804 reflects the circularly polarized light to the wave plate 803, and the wave plate 803 converts the circularly polarized light into a second polarization state (linearly polarized light whose vibration direction is the second direction), and the converted imaging light in the second polarization state is propagated to the polarizer 802 and transmitted to a human eye position through the polarizer 802.

Ambient light (shown by the dashed line in the drawings) is transmitted from the outside through the transflective element 804 and propagates forward to the wave plate 803, and is further transmitted to the human eye position through the wave plate 803 and the polarizer 802 in sequence.

In embodiments of FIGS. 6-8, a first polarization state and a second polarization state indicate that the vibration directions of light are different. The vibration direction of the first polarization state and the vibration direction of the second polarization state are perpendicular to each other. For example, light with the first polarization state may be polarized light whose polarization state is P direction, and light with the second polarization state may be polarized light whose polarization state is S direction. Considering that P-polarized light and S-polarized light can rotate around the light propagation direction in the premise of being perpendicular to each other, thus the first polarization state may also be polarized light whose polarization state is at a certain angle to the P direction, and the second polarization state may also be polarized light whose polarization state is at a certain angle to the S direction. A third polarization state and a fourth polarization state may be circularly polarized light or elliptically polarized light with opposite rotation directions.

In an example of the present disclosure, a positioning component and a corresponding optical component are formed by integrated injection molding process. The relative position between the positioning component and the optical component formed by the integrated injection molding process meets requirements of optical accuracy index.

In each optical element, the positioning component corresponds to the optical component, e.g., an image projection component 211 and a first positioning component 212 included in a first optical element 210 corresponds to each other, the image projection component 211 and the first positioning component 212 are formed by integrated injection molding process.

In this example, a positioning component and a corresponding optical component are integrated by the integrated injection molding process, so as to avoid mounting errors between the positioning component and the optical component during the assembly process.

In the present description, structure of a first positioning component 212, structure of a second positioning component 222, and structure of a third positioning component 232 are configured such that when a first optical element 210, a second optical element 220, and a third optical element 230 are assembled into an optical imaging apparatus for optical imaging, an image projection component 211, a beam splitting component 221 and a reflective component 231 achieve optical alignment according to desired optical accuracy index requirements.

When the structures of the first positioning component 212, the second positioning component 222, and the third positioning component 232 are connected to each other for mounting, the positional relationship among the first optical element 210, the second optical element 220, and the third optical element 230 is determined. In an example, when the structures of the first positioning component 212, the second positioning component 222, and the third positioning component 232 are connected to each other for mounting, the positional relationship among the first optical element 210, the second optical element 220, and the third optical element 230 is unique. In another example, the positional relationship among the first optical element 210, the second optical element 220, and the third optical element 230 can be determined by using any two of the first positioning component 212, the second positioning component 222, and the third positioning component 232.

In an example of the present disclosure, an optical accuracy metric can include at least one of assembly tolerance and assembly accuracy. Assembly tolerance is the redundancy of clearance or interference when each component is mounted, and assembly accuracy is the minimum error achieved by the geometric parameters of the optical imaging apparatus after respective components are assembled into an optical imaging apparatus for optical imaging.

In the present disclosure, after an optical imaging apparatus is assembled, an image projection component 211 can project the generated image, the projected light for the generated image is reflected to a reflective component 231 through a beam splitting component 221, the light is then reflected to the beam splitting component 221 through the reflective component 231, and then transmitted to a pupil 240 by the beam splitting component 221 so that the generated image can be seen. The propagation path of the image light projected by the image projection component 211 is shown by the solid line in FIG. 2.

In an example, when an optical imaging apparatus is an augmented reality display apparatus, light of a real scene can also reach a pupil 240 through a third optical element 230 and a second optical element 220, so that the real scene can also be seen. Taking FIG. 2 as an example, a propagation path of light in a real scene is shown by the dashed line, which is first transmitted to a beam splitting component 221 by a reflective component 231, and then transmitted to a pupil 240 by a beam splitting component 221.

In an example of the present disclosure, each of a first positioning component 212, a second positioning component 222, and a third positioning component 232 includes a first positioning structure and a second positioning structure.

In this example, a first positioning structure in each positioning component is configured to perform positioning assembly with one of the other two positioning components, and a second positioning structure is configured to perform positioning assembly with the other of these other two positioning components.

Figure 9:
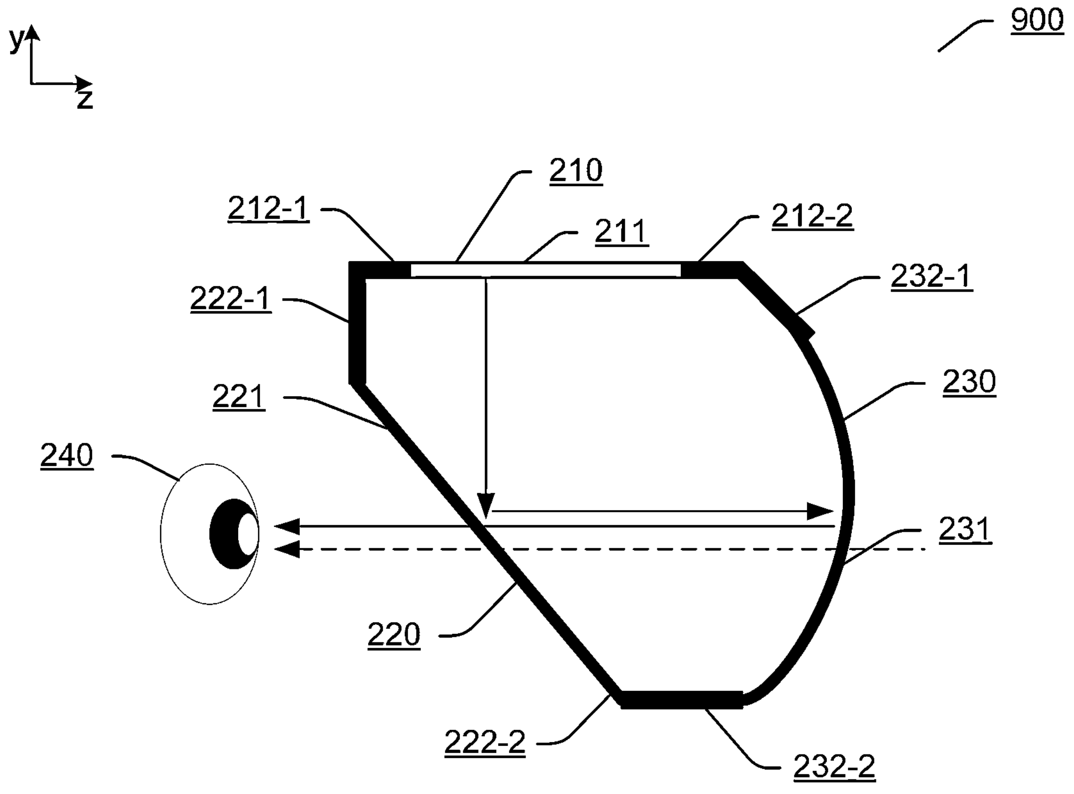
FIG. 9 illustrates a schematic diagram of a positioning structure included in each positioning component in an optical imaging apparatus of an example of an embodiment of the present disclosure.

Taking FIG. 9 as an example, FIG. 9 illustrates a schematic diagram of a positioning structure included in each positioning component in an optical imaging apparatus 900 of an example of an embodiment of the present disclosure. As shown in FIG. 9, in a first positioning component 212 included in a first optical element 210, a first positioning structure is 212-1, and a second positioning structure is 212-2. In a second positioning component 222 included in a second optical element 220, a first positioning structure is 222-1, and a second positioning structure is 222-2. In a third positioning component 232 included in a third optical element 230, a first positioning structure is 232-1, and a second positioning structure is 232-2. For the first optical element 210, the first positioning structure 212-1 is configured to perform positioning assembly with the second positioning component 222 in the second optical element 220, and the second positioning structure 212-2 is configured to perform positioning assembly with the third positioning component 232 in the third optical element 230.

In an example, each positioning structure included in each positioning component is in one-to-one correspondence with positioning structures included in other positioning components. In this way, it can be ensured that the structural relationship among the first optical element 210, the second optical element 220, and the third optical element 230 is determined when the first positioning component 212, the second positioning component 222, and the third positioning component 232 are assembled, which in turn improves the certainty and convenience of assembling the optical imaging apparatus.

Taking FIG. 9 as an example, a first positioning structure 212-1 in a first optical element 210 is in a one-to-one correspondence with a first positioning structure 222-1 in a second optical element 220, a second positioning structure 212-2 in the first optical element 210 is in a one-to-one correspondence with a first positioning structure 232-1 in a third optical element 230, and a second positioning structure 222-2 in the second optical element 220 is in a one-to-one correspondence with a second positioning structure 232-2 in the third optical element 230.

In an example of the present disclosure, one of a first positioning component 212, a second positioning component 222 and a third positioning component 232 is used as a reference positioning component, the reference positioning component includes a first positioning structure and a second positioning structure, and the other two positioning components include a positioning structure.

The first positioning structure and the second positioning structure of the reference positioning component are respectively configured to perform positioning assembly with one positioning structure of the other two positioning components.

In an example of the present disclosure, a first positioning structure and a second positioning structure can include at least one of structures such as snap slot, snap hole, protrusion, screw hole, snap join, and positioning edge, etc.

In an example of the present disclosure, a first positioning structure and a second positioning structure have a same structure or different structures. As an example, a first positioning structure and a second positioning structure included in a first optical element 210 may be snap slots. As another example, in a second optical element 220, a first positioning structure is a snap slot, and a second positioning structure may be a positioning edge.

In an example, respective positioning structures in each positioning component have a structure that matches a corresponding positioning structure in a positioning component to which positioning and assembling are performed.

In an example, a screw hole and another screw hole can be matching structures, two matching screw holes or more matching screw holes are connected in alignment, and aligned screw holes are fixed by using corresponding screws.

Figure 10:
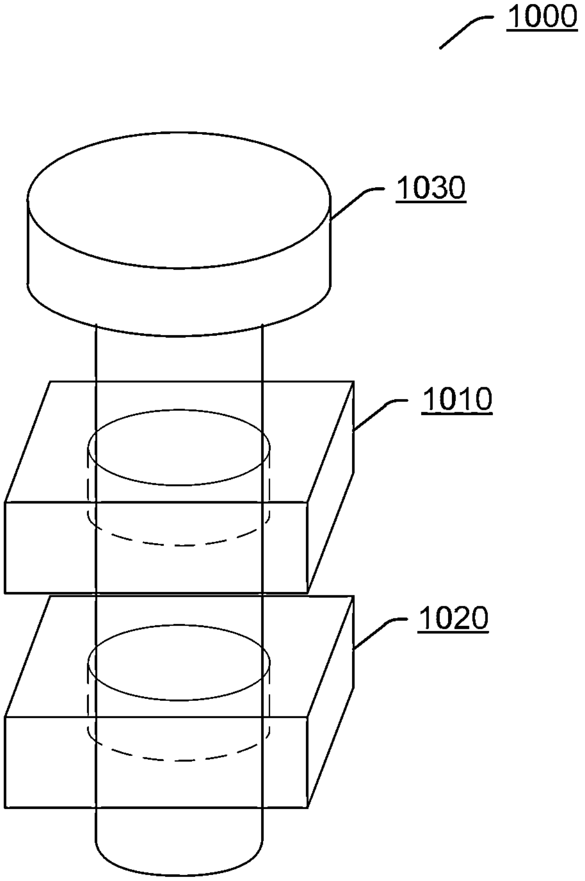
FIG. 10 illustrates a schematic diagram of performing positioning in a case that a positioning structure includes a screw hole of an example of an embodiment of the present disclosure.

Taking FIG. 10 as an example, FIG. 10 illustrates a schematic diagram of performing positioning when a positioning structure 1000 includes a screw hole of an example of an embodiment of the present disclosure. As shown in FIG. 10, a screw hole 1010 and a screw hole 1020 are two matching screw holes, and the screw hole 1010 and the screw hole 1020 have the same diameter and the same thread. A screw 1030 is a screw matching the screw hole 1010 and the screw hole 1020, namely, the screw 1030 can be screwed into the screw hole 1010 and the screw hole 1020. When two corresponding positioning structures include the screw hole 1010 and the screw hole 1020, during the assembly process, the screw hole 1010 and the screw hole 1020 can be placed in alignment, and the screw 1030 is then screwed into the screw hole 1010 and the screw hole 1020 to fix the screw hole 1010 and the screw hole 1020, thereby positioning these two positioning structures. An optical accuracy metric can be achieved by using the faces where the locating edge 1110 and the locating edge 1120 are in contact with each other.

In another example, a positioning edge and another positioning edge can be matching structures, and two matching positioning edges or more matching positioning edges are connected in alignment to implement structure positioning. After positioning, two positioning edge structures can be fixed by means of glue, adhesive, etc.

Figure 11:
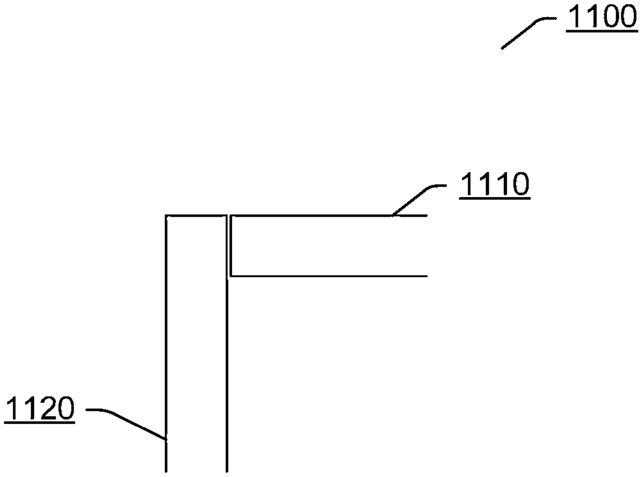
FIG. 11 illustrates a schematic diagram of performing positioning in a case that a positioning structure includes positioning edges of an example of an embodiment of the present disclosure.

Taking FIG. 11 as an example, FIG. 11 illustrates a schematic diagram of performing positioning when a positioning structure includes positioning edges of an example of an embodiment of the present disclosure. As shown in FIG. 11, a positioning edge 1110 and a positioning edge 1120 are two matching positioning edges, during positioning assembly, the positioning edge 1110 and the positioning edge 1120 are connected in alignment to achieve positioning purpose corresponding to the two positioning structures.

In another example, a snap joint and another snap joint can be matching structures, and the two matching snap joints can be connected in a snap-fit manner. The two snap joints are not only for positioning, but also for fixing.

Figure 12:
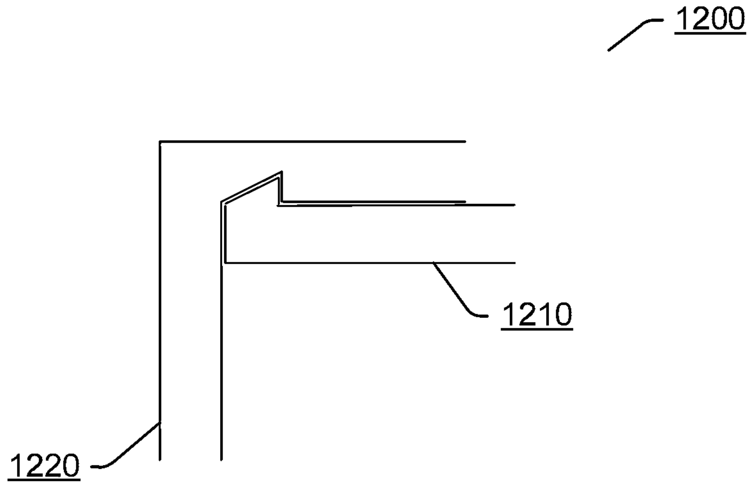
FIG. 12 illustrates a schematic diagram of performing positioning in case that a positioning structure includes a snap joint of an example of an embodiment of the present disclosure.

Taking FIG. 12 as an example, FIG. 12 illustrates a schematic diagram of performing positioning when a positioning structure 1200 includes a snap joint of an example of an embodiment of the present disclosure. As shown in FIG. 12, a snap joint 1210 and a snap joint 1220 are two matching snap joints, the snap joint 1210 can be referred to as a male joint, and the snap joint 1220 can be referred to as a female joint, and the male joint and the female joint can be snap-fit with each other so that the snap joint 1210 and the snap joint 1220 are tightly coupled.

In another example, a snap hole and a protrusion can be matching structures, the protrusion can be inserted into the matching snap hole, and the protrusion and the snap hole are tightly connected. The shape-matching snap hole and protrusion can be designed as structures of various shapes, e.g., if the protrusion is a diamond-shaped structure, the matching snap hole is also a diamond-shaped structure.

Figure 13:
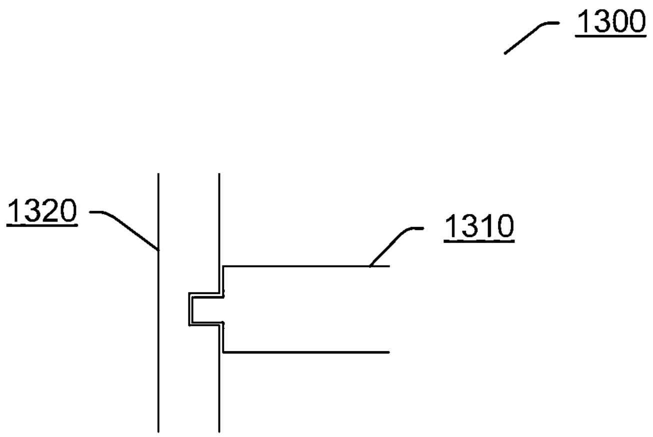
FIG. 13 illustrates a schematic diagram of performing positioning in a case that a positioning structure includes a snap hole and a protrusion of an example of an embodiment of the present disclosure.

Taking FIG. 13 as an example, FIG. 13 illustrates a schematic diagram of performing positioning when a positioning structure 1300 includes a snap hole and a protrusion of an example of an embodiment of the present disclosure. As shown in FIG. 13, a snap hole 1320 and a protrusion 1310 are matched, and the protrusion 1310 is inserted into the snap hole 1320 during positioning assembly, so that the protrusion 1310 and the snap hole 1320 are closely connected to implement positioning.

In another example, a snap slot and another snap slot can be matching structures, and the matching snap slots can be embedded in and connected to each other to implement structure positioning.

Figure 14:
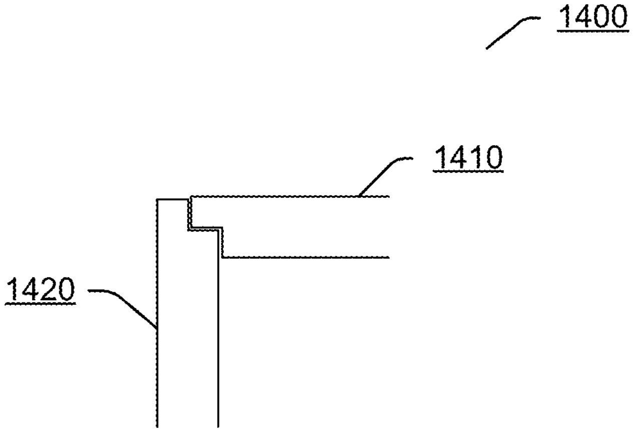
FIG. 14 illustrates a schematic diagram of performing positioning in a case that a positioning structure includes a snap slot of an example of an embodiment of the present disclosure.

Taking FIG. 14 as an example, FIG. 14 illustrates a schematic diagram of performing positioning when a positioning structure 1400 includes a snap slot of an example of an embodiment of the present disclosure. As shown in FIG. 14, a snap slot 1410 and a snap slot 1420 are matched, each snap slot includes a convex structure part and a concave structure part, and the convex structure part of the snap slot 1410 matches the concave structure part of the snap slot 1420, the concave structure part of the snap slot 1410 matches the convex structure part of the snap slot 1420, and the snap slot 1410 and the snap slot 1420 are correspondingly connected to achieve positioning purpose during positioning assembly.

In this example, the two matching snap slots include a snap slot with a convex structure and a snap slot with a concave structure, and the outer angle formed by the snap slot with the concave structure is the same as the inner angle formed by the snap slot with the convex structure for positioning.

Figure 15:
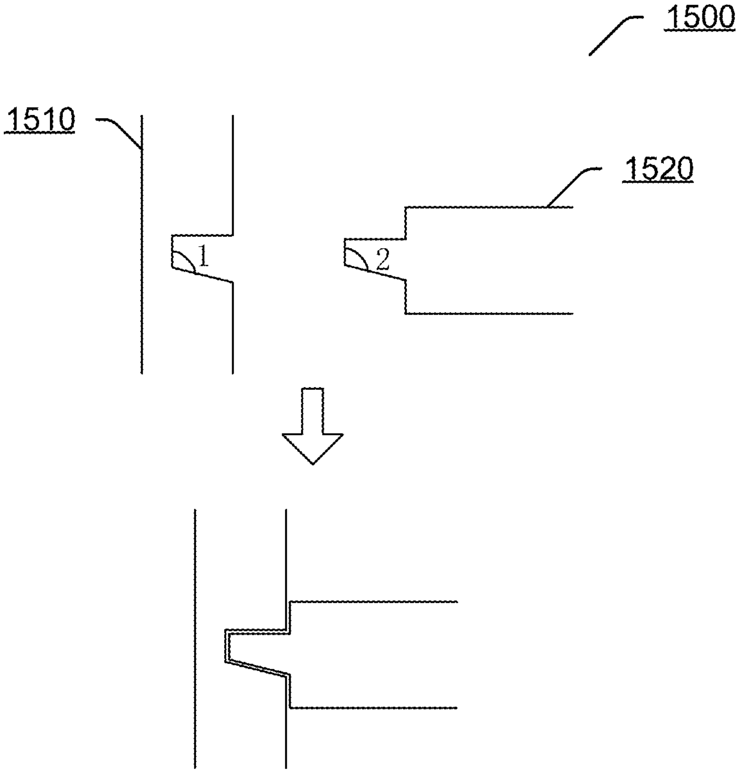
FIG. 15 illustrates a schematic diagram of performing positioning in a case that a positioning structure includes a snap slot of another example of an embodiment of the present disclosure.

Taking FIG. 15 as an example, FIG. 15 illustrates a schematic diagram of performing positioning when a positioning structure 1500 includes a snap slot of another example of an embodiment of the present disclosure. As shown in FIG. 15, an outer angle formed by the snap slot 1510 with concave structure includes an angle 1 and a right angle, and the inner angle formed by the snap slot 1520 with convex structure includes an angle 2 and a right angle, where the right angle as the outer angle matches the right angle as the inner angle, and the angle 1 is the same as the angle 2, namely, they match.

In another example, a snap slot and a positioning edge can be matched structures, and the positioning edge can be embedded in the matching snap slot and connected to implement structure positioning. In this example, an angle formed by the positioning edge matches an angle formed by the snap slot, so that the positioning edge and the snap slot are tightly connected. The angle formed by the positioning edge and the angle formed by the snap slot can be specified.

Figure 16:
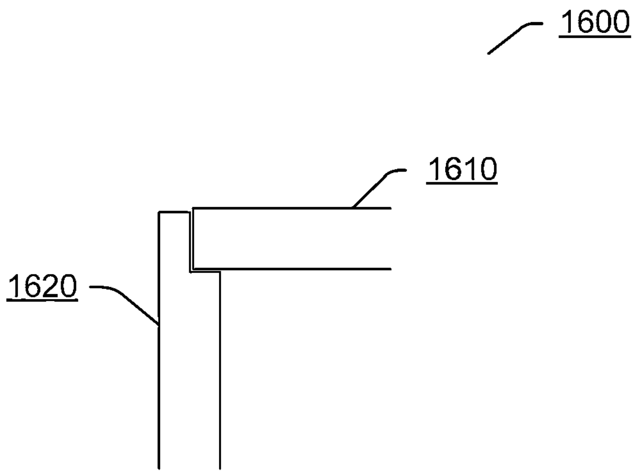
FIG. 16 illustrates a schematic diagram of performing positioning in a case that a positioning structure includes a snap slot and a positioning edge of an example of an embodiment of the present disclosure.

Taking FIG. 16 as an example, FIG. 16 illustrates a schematic diagram of performing positioning edges when a positioning structure 1600 includes a snap slot and positioning edges of an example of an embodiment of the present disclosure. As shown in FIG. 16, a positioning edge 1610 matches a snap slot 1620, an angle formed by the positioning edge 1610 is a right angle, and an angle formed by the snap slot 1620 is also a right angle, the right angles match each other so that the positioning edge 1610 can be embedded in concave structure of the snap slot 1620, and the positioning edge 1610 and the snap slot 1620 are correspondingly connected to achieve positioning purpose during positioning assembly.

The corresponding positioning structures match each other, and different corresponding positioning structures can adopt a same type of structure. For example, all positioning structures in an optical imaging apparatus adopt a snap slot structure.

Different corresponding positioning structures can also adopt different types of structures. For example, corresponding positioning structures in an optical imaging apparatus can include a snap hole and a protrusion, a screw hole and another screw hole, and a snap slot and another snap slot. Taking FIG. 9 as an example, the corresponding positioning structures 212-1 and 222-1 are positioning structures that adopt a snap hole and a protrusion, and the corresponding positioning structures 212-2 and 232-1 are positioning structures that adopt a screw holes and another screw hole, and the corresponding positioning structures 222-2 and 232-2 are positioning structures that adopt a snap slot and another snap slot.

In an example of the present disclosure, when corresponding positioning structures include a snap hole and a protrusion, the matching snap hole and the protrusion form a right-angle-tenon structure.

In this example, the right-angle-tenon structure can be one of various tenon joint structures such as a single-sided-cut-shoulder-tenon joint structure, an open through dovetail joint structure, a semi-open through dovetail joint structure, an open double dowel joint structure, a concealed dovetail joint structure, an open dovetail joint structure, a semi-open dowel joint structure, a concealed double dovetail joint structure, an open dowel joint structure, a through dovetail joint structure and a groove joint structure, etc.

In an example of the present disclosure, at least one of a first positioning component 212, a second positioning component 222, and a third positioning component 232 has a component frame.

In an example, a component frame of each positioning component is a part of the positioning component, and the component frame and other parts of the positioning component are also integrally formed. In another example, each positioning component is a component frame, and the component frame and the corresponding optical component are integrally formed.

In this example, the component frame surrounds the corresponding optical component and corresponding first positioning structure and second positioning structure are provided on the component frame.

Figure 17:
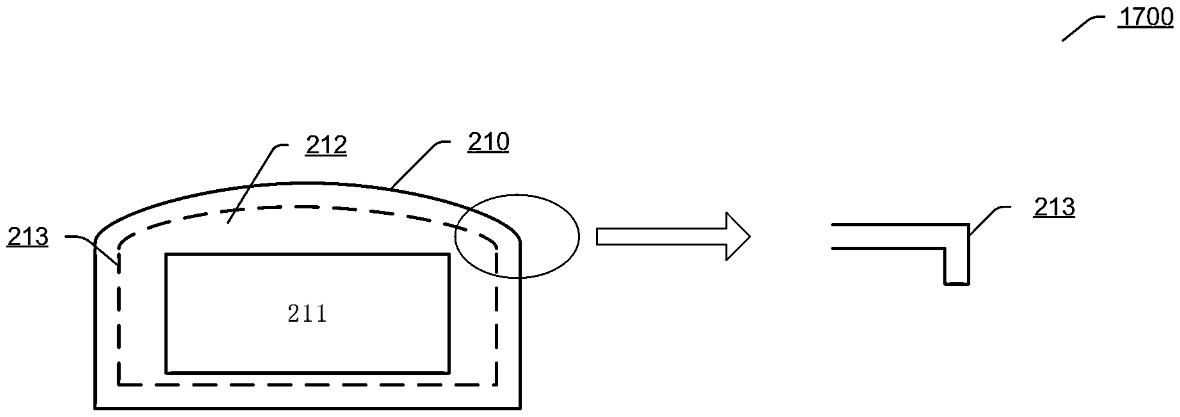
FIG. 17 illustrates a schematic diagram of an optical component is surrounded by a component frame of an example of an embodiment of the present disclosure.

Taking FIG. 17 as an example, FIG. 17 illustrates a schematic diagram of an optical component is surrounded by a component frame of an example of an embodiment of the present disclosure. As shown in FIG. 17, the portion between the dashed line and the solid edge line of a first optical element 210 is a component frame 213, the component frame 213 is a part of a first positioning component 212 of the first optical element 210. The component frame 213 surrounds an image projection component 211 in an annular shape, and the corresponding first positioning structure and second positioning structure disposed on the component frame 213 can be positioning edges.

In an example of the present disclosure, when a first positioning structure and a second positioning structure are snap slots, the first positioning structure and the second positioning structure are formed as a single snap slot.

In this example, the formed single snap slot includes the first positioning structure and the second positioning structure, and the first positioning structure and the second positioning structure are integrated, and both belong to a portion of the single snap slot.

Figure 18:
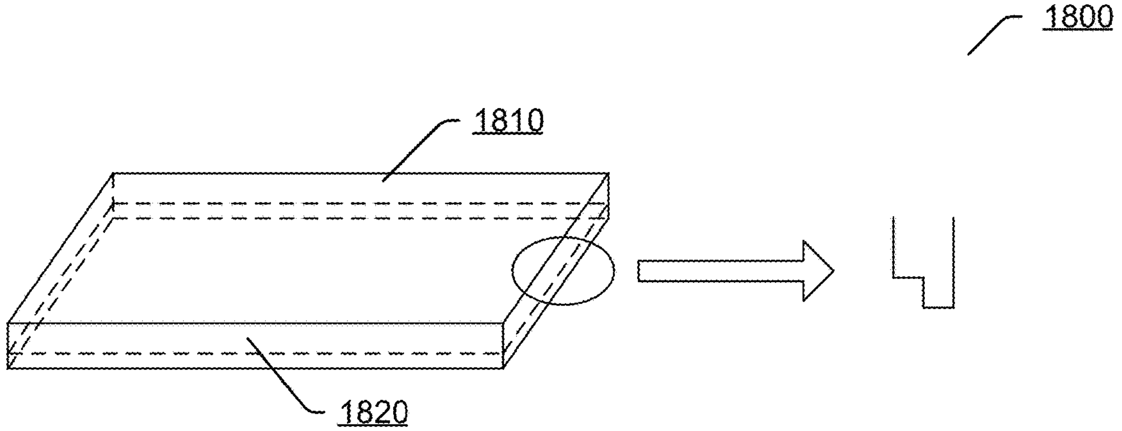
FIG. 18 illustrates a schematic diagram of a first positioning structure and a second positioning structure which are formed as a single snap slot of an example of an embodiment of the present disclosure.

Taking FIG. 18 as an example, FIG. 18 illustrates a schematic diagram of a first positioning structure and a second positioning structure which are formed as a single snap slot of an example of an embodiment of the present disclosure. As shown in FIG. 18, an edge of an optical element shown in FIG. 18 has a snap slot structure, the snap slot encircles the edge of the entire optical element and surrounds optical components of the optical element, and the snap slot belongs to a single snap slot. The snap slot includes a first positioning structure 1810 and a second positioning structure 1820, the first positioning structure 1810 is located on a side of the snap slot, and the second positioning structure 1820 is located on another side of the snap slot.

In another example, when a first positioning structure and a second positioning structure are snap slots, the first positioning structure and the second positioning structure are two independent snap slots.

Figure 19:
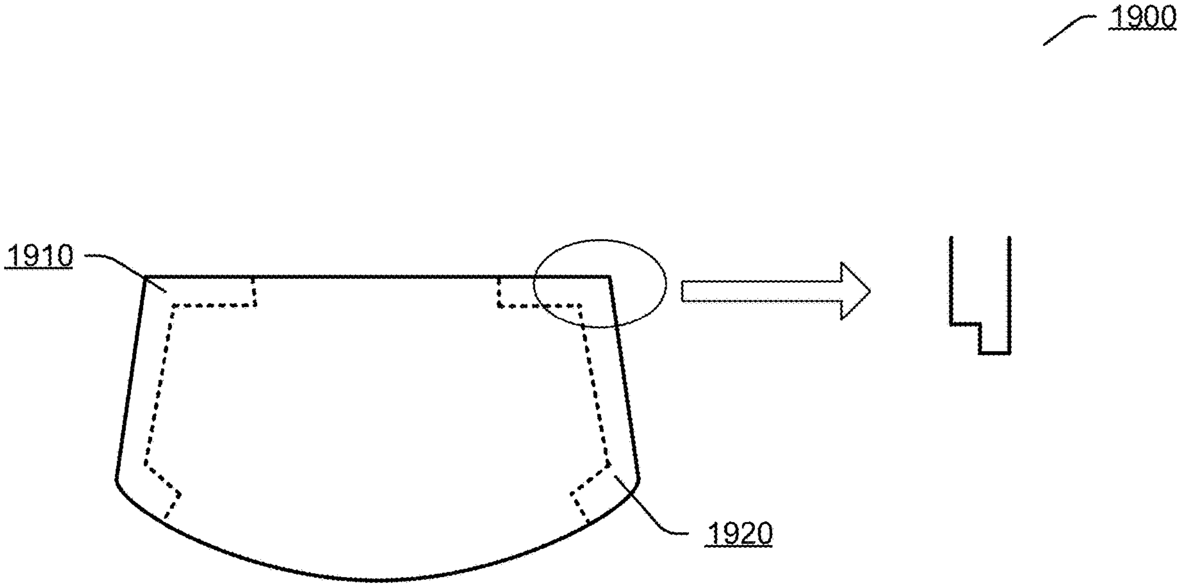
FIG. 19 illustrates a schematic diagram of a first positioning structure and a second positioning structure which are snap slots of an example of an embodiment of the present disclosure.

Taking FIG. 19 as an example, FIG. 19 illustrates a schematic diagram of a first positioning structure and a second positioning structure which are snap slots of an example of an embodiment of the present disclosure. As shown in FIG. 19, a first positioning structure 1910 and a second positioning structure 1920 are both snap slots, and the first positioning structure 1910 and the second positioning structure 1920 are two independent snap slots.

Figure 20:
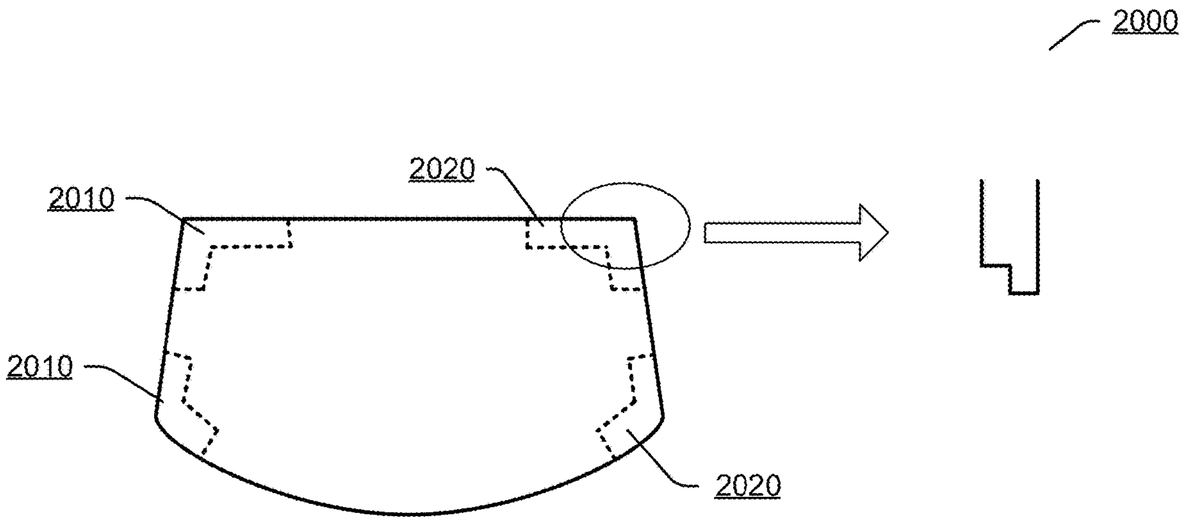
FIG. 20 illustrates a schematic diagram of a first positioning structure and a second positioning structure which are snap slots of another example of an embodiment of the present disclosure.

In an example, each positioning structure can include a plurality of independent individual snap slots. Taking FIG. 20 as an example, FIG. 20 illustrates a schematic diagram of a first positioning structure and a second positioning structure which are snap slots of another example of an embodiment of the present disclosure. As shown in FIG. 20, a first positioning structure 2010 includes two individual snap slots, and a second positioning structure 2020 includes two individual snap slots.

In an example of the present disclosure, when a first positioning structure or a second positioning structure are snap holes, the first positioning structure or the second positioning structure includes at least three snap holes. The position of each snap hole can be specified. In this example, the at least three snap holes can make the connection of the positioning structures more precise, thereby reducing optical errors and improving optical accuracy of the optical imaging apparatus.

Figure 21:
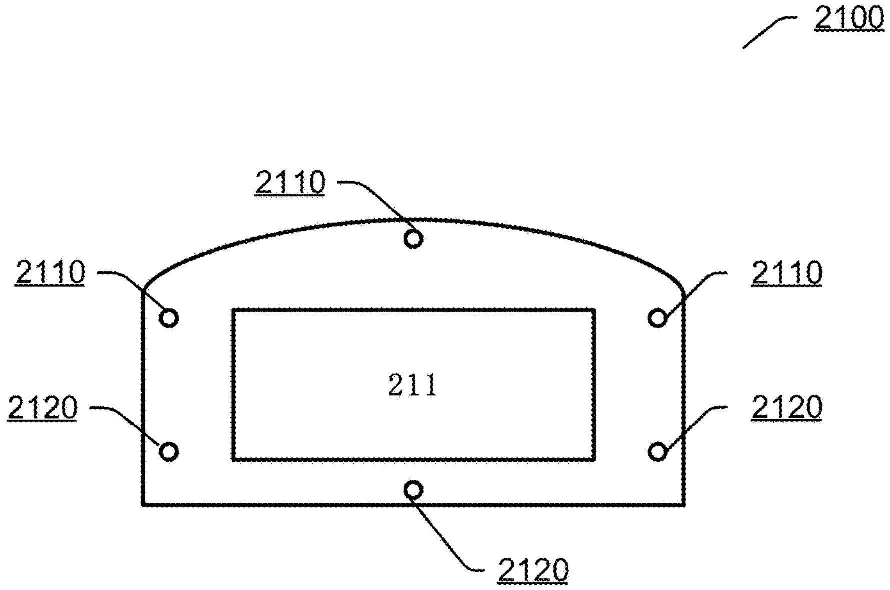
FIG. 21 illustrates a schematic diagram of a first positioning structure and a second positioning structure included in a first optical element which are snap holes of an example of an embodiment of the present disclosure.

Taking FIG. 21 as an example, FIG. 21 illustrates a schematic diagram of a first positioning structure and a second positioning structure included in a first optical element 210 which are snap holes of an example of an embodiment of the present disclosure. As shown in FIG. 21, a first optical element 210 includes a first positioning structure 2110 and a second positioning structure 2120, the first positioning structure 2110 includes three snap holes, and the second positioning structure 2120 also includes three snap holes.

When the first positioning structure or the second positioning structure included in the second optical element 220 and the third optical element 230 is a snap hole, the second optical element 220 and the third optical element 230 can include at least three snap holes.

In an example of the present description, when a first optical element 210, a second optical element 220, and a third optical element 230 are assembled into an optical imaging apparatus for optical imaging based on structures of a first positioning component 212, a second positioning component 222, and a third positioning component 232, one of the first positioning component 212, the second positioning component 222 and the third positioning component 232 can be mounted as a reference component.

In an example, a first positioning component 212 is determined as a reference component. A first positioning structure included in the first positioning component 212 is connected to a first positioning structure included in a second positioning component 222 so that a first optical element 210 and a second optical element 220 are mounted; and a second positioning structure included in the first positioning component 212 is connected to a first positioning structure included in a third positioning component 232 so that the first optical element 210 and a third optical element 230 are mounted.

In another example, a second positioning component 222 is determined as a reference component. A first positioning structure included in the second positioning component is connected to a first positioning structure included in a first positioning component 212 so that a second optical element 220 and a first optical element 210 are mounted; and a second positioning structure included in the second positioning component 222 is connected to a second positioning structure included in a third positioning component 232 so that the second optical element 220 and a third optical element 230 are assembled.

In another example, a third positioning component 232 is determined as a reference component. A first positioning structure included in the third positioning component is connected to a second positioning structure included in a first positioning component 212 so that a reflective element and a first optical element 210 are mounted; and a second positioning structure included in the third positioning component 232 is connected to a second positioning structure included in a second positioning component 222 so that a third optical element 230 and a second optical element 220 are mounted.

In an example, a first positioning component at least partially surrounds an image projection component; a second positioning component at least partially surrounds a beam splitting component; and a third positioning component at least partially surrounds a reflective component.

In an example, a component frame of a positioning component extends towards other two positioning components.

In an example, an optical imaging apparatus includes: a first optical element, the first optical element including an image projection component and a first positioning component around the image projection component; a second optical element, the second optical element including a beam splitting component and a second positioning component around the beam splitting component; and a third optical element, the third optical element including a reflective component and a third positioning component around the reflective component; wherein the beam splitting component is configured to reflect image light emitted by the image projection component to the reflective component and transmit image imaging light from the reflective component and ambient imaging light transmitted by the reflective component, the reflective component is configured to reflect image imaging light from the beam splitting component and transmit the ambient imaging light, structures of the first positioning component, the second positioning component, and the third positioning component are configured such that after the first optical element, the second optical element, and the third optical element are assembled into an optical imaging apparatus, the image projection component, the beam splitting component and the reflective component achieve optical alignment according to desired optical accuracy index requirements.

In an example, a first positioning component is integrally formed with an image projection component; a second positioning component is integrally formed with a beam splitting component; and a third positioning component is integrally formed with a reflective component.

In an example, one of a first positioning component, a second positioning component, and a third positioning component as a reference positioning component includes a first positioning structure and a second positioning structure, and the other two positioning components include a positioning structure; wherein the first positioning structure and the second positioning structure of the reference positioning component are respectively configured to be positioned and mounted to the positioning structure of the other two positioning components, wherein respective positioning structures in each positioning component have structures that match corresponding positioning structures in a positioning component to which respective positioning structures are positioned and mounted.

In an example, a reference positioning component extends towards other two optical elements. For example, the reference positioning component extends to be parallel to the plane in which other two optical elements are located.

In an example, an optical imaging apparatus includes: a first optical element, the first optical element including an image projection component and a first positioning component around the image projection component; a second optical element, the second optical element including a beam splitting component and a second positioning component around the beam splitting component; and a third optical element, the third optical element including a reflective component and a third positioning component around the reflective component; wherein the beam splitting component is configured to reflect image light emitted by the image projection component to the reflective component and transmit image imaging light from the reflective component and ambient imaging light transmitted by the reflective component, the reflective component is configured to reflect image imaging light from the beam splitting component and transmit the ambient imaging light, structures of the first positioning component, the second positioning component and the third positioning component are configured such that after the first optical element, the second optical element and the third optical element are assembled into an optical imaging apparatus, the image projection component, the beam splitting component and the reflective component achieve optical alignment according to desired optical accuracy index requirements; the first positioning component as a reference positioning component includes a first positioning structure and a second positioning structure, the first positioning structure and the second positioning component of the second optical element are mounted in position, the second positioning structure and the third positioning component of the third optical element are mounted in position, the first positioning structure and the second positioning structure are screw holes.

The term "exemplary" used throughout the description means "serving as an example, instance, or illustration", and not "preferred" or "advantageous" over other embodiments. The detailed description includes specific details for the purpose of providing an understanding of the described techniques. These techniques, however, may be practiced without these specific details. In some instances, well-known structures and apparatuses are shown in block diagram form in order to avoid obscuring the concepts of the described embodiments.

The optional implementations of the embodiments of the present disclosure are described above in detail in conjunction with the appended drawings, however, the embodiments of the present disclosure are not limited to the specific details in the foregoing embodiments, within the scope of the technical concept of the embodiments of the present disclosure, a variety of simple variations may be made to the technical solutions of the embodiments of the present disclosure, which all fall into the scope of the embodiments of the present disclosure.

The foregoing description of the present disclosure is provided to enable a person skilled in the art to implement or use the present disclosure. Various modifications to the present disclosure will be readily apparent to those skilled in the art, and the generic principles defined herein may be applied to other variations without departing from the scope of the present disclosure. Thus, the present disclosure is not limited to the examples and designs described herein, but is to be accorded the broadest scope consistent with the principles and novel features disclosed herein.

What is claimed is:

1. An optical imaging apparatus, comprising:

a first optical element comprising an image projection component and a first positioning component integrally formed with the image projection component;

a second optical element comprising a beam splitting component and a second positioning component integrally formed with the beam splitting component; and a third optical element comprising a reflective component and a third positioning component integrally formed with the reflective component;

wherein the beam splitting component is configured to reflect image light emitted by the image projection component to the reflective component and transmit image imaging light from the reflective component and ambient imaging light transmitted by the reflective component, the reflective component is configured to reflect image imaging light from the beam splitting component and transmit the ambient imaging light, the first positioning component, the second positioning component and the third positioning component having structures configured to enable the image projection component, the beam splitting component and the reflective component to achieve optical alignment according to desired optical accuracy index requirements after the first optical element, the second optical element and the third optical element are assembled into an optical imaging apparatus, wherein one of the first positioning component, the second positioning component, and the third positioning component as a reference positioning component comprises a first positioning structure and a second positioning structure, and the other two positioning components comprise a positioning structure;

wherein the first positioning structure and the second positioning structure of the reference positioning component are respectively configured to be positioned and mounted to the positioning structure of the other two positioning components, wherein respective positioning structures in each positioning component have structures that match corresponding positioning structures in a positioning component to which respective positioning structures are positioned and mounted.

2. The optical imaging apparatus of claim 1, wherein the first positioning component at least partially surrounds the image projection component;

the second positioning component at least partially surrounds the beam splitting component; and the third positioning component at least partially surrounds the reflective component.

3. The optical imaging apparatus of claim 1, wherein the first positioning structure and the second positioning structure comprise at least one of snap slot, snap hole, protrusion, screw hole, snap join, and positioning edge.

4. The optical imaging apparatus of claim 3, wherein a matching snap hole and protrusion form a right-angle-tenon structure.

5. The optical imaging apparatus of claim 1, wherein when the first positioning structure and the second positioning structure are snap slots, the first positioning structure and the second positioning structure are formed as a single snap slot or two independent snap slots.

6. The optical imaging apparatus of claim 1, wherein the first positioning structure and the second positioning structure have a same structure or have different structures.

7. The optical imaging apparatus of claim 1, wherein at least one of the first positioning component, the second positioning component, and the third positioning component has a component frame, the component frame surrounds a corresponding optical component, and corresponding first positioning structure and second positioning structure are provided on the component frame.

8. The optical imaging apparatus of claim 7, wherein the component frame of the positioning component extends towards the other two positioning components.

9. The optical imaging apparatus of claim 1, wherein the positioning component and the corresponding optical component are formed by integrated injection molding process.

10. The optical imaging apparatus of claim 1, wherein the image projection component comprises an image source and a circular polarizer attached to or adjacent to a side of the image source facing the beam splitting component, the beam splitting component comprises a polarizer and a wave plate attached to a side of the polarizer facing the reflective component, and the reflective component comprises a transflective element.

11. The optical imaging apparatus of claim 1, wherein the image projection component comprises an image source and a first polarizer attached to or adjacent to a side of the image source facing the beam splitting component, the beam splitting component comprises a transflective element, the reflective component comprises a second polarizer.

12. The optical imaging apparatus of claim 1, wherein the image projection component comprises an image source, the beam splitting component comprises a polarizer, the reflective component comprises a transflective element and a wave plate attached to or adjacent to a side of the transflective element facing the beam splitting component.

13. The optical imaging apparatus of claim 1, wherein the optical imaging apparatus is formed as a head mounted apparatus.

14. An optical imaging apparatus comprising:

a first optical element comprising an image projection component and a first positioning component around the image projection component;

a second optical element comprising a beam splitting component and a second positioning component around the beam splitting component; and a third optical element comprising a reflective component and a third positioning component around the reflective component;

wherein the beam splitting component is configured to reflect image light emitted by the image projection component to the reflective component and transmit image imaging light from the reflective component and ambient imaging light transmitted by the reflective component, the reflective component is configured to reflect image imaging light from the beam splitting component and transmit the ambient imaging light, the first positioning component, the second positioning component, and the third positioning component have structures configured to enable the image projection component, the beam splitting component and the reflective component to achieve optical alignment after the first optical element, the second optical element, and the third optical element are assembled into an optical imaging apparatus, wherein each of the first positioning component, the second positioning component, and the third positioning component comprises a first positioning structure and a second positioning structure, wherein the first positioning structure in each positioning component is configured to perform positioning assembly with one of the other two positioning components, and the second positioning structure is configured to perform positioning assembly with the other one of the other two positioning components, and respective positioning structures in each positioning component has a structure that matches a corresponding positioning structure in a positioning component to which positioning assembly is performed.

15. The optical imaging apparatus of claim 14, wherein the first positioning component is integrally formed with the image projection component, the second positioning component is integrally formed with the beam splitting component, and the third positioning component is integrally formed with the reflective component.

16. The optical imaging apparatus of claim 14, wherein at least one of the first positioning component, the second positioning component, and the third positioning component has a component frame, the component frame surrounds a corresponding optical component, and corresponding first positioning structure and second positioning structure are provided on the component frame.

17. The optical imaging apparatus of claim 16, wherein the component frame extends towards other two positioning components.

18. An optical imaging apparatus comprising:

a first optical element comprising an image projection component and a first positioning component configured as integrally formed portions of a one-piece structure;

a second optical element comprising a beam splitting component and a second positioning component configured as integrally formed portions of a one-piece structure; and a third optical element comprising a reflective component and a third positioning component configured as integrally formed portions of a one-piece structure;

wherein the beam splitting component is configured to reflect image light emitted by the image projection component to the reflective component and transmit image imaging light from the reflective component and ambient imaging light transmitted by the reflective component, the reflective component is configured to reflect image imaging light from the beam splitting component and transmit the ambient imaging light, the first positioning component, the second positioning component, and the third positioning component have structures configured to enable the image projection component, the beam splitting component and the reflective component to achieve optical alignment after the first optical element, the second optical element, and the third optical element are assembled into an optical imaging apparatus, wherein one of the first positioning component, the second positioning component, and the third positioning component as a reference positioning component comprises a first positioning structure and a second positioning structure, and the other two positioning components comprise a positioning structure;

wherein the first positioning structure and the second positioning structure of the reference positioning component are respectively configured to be positioned and mounted to the positioning structure of the other two positioning components, wherein respective positioning structures in each positioning component have structures that match corresponding positioning structures in a positioning component to which respective positioning structures are positioned and mounted.

* * * * *